United States Patent [19]

Sugawara

[11] Patent Number: 5,247,393
[45] Date of Patent: Sep. 21, 1993

[54] ZOOM LENS

[75] Inventor: Saburo Sugawara, Kawasaki, Japan

[73] Assignee: Canon Kabushiki Kaisha, Tokyo, Japan

[21] Appl. No.: 823,772

[22] Filed: Jan. 22, 1992

[30] Foreign Application Priority Data

Jan. 30, 1991 [JP] Japan .................. 3-009828

[51] Int. Cl.$^5$ .............. G02B 15/14; G02B 9/34; G02B 9/14
[52] U.S. Cl. .................. 359/690; 359/687; 359/685; 359/684; 359/681; 359/676; 359/774; 359/785; 359/786
[58] Field of Search ............ 359/676, 681, 684, 685, 359/687, 690, 695, 774, 785, 786

[56] References Cited

U.S. PATENT DOCUMENTS

| | | | |
|---|---|---|---|
| 4,380,376 | 4/1983 | Suda et al. | 359/690 |
| 4,449,791 | 5/1984 | Terasawa et al. | 359/690 |
| 4,494,828 | 1/1985 | Masumoto et al. | 359/690 |
| 4,576,443 | 3/1986 | Itoh | 359/690 |
| 4,623,226 | 11/1986 | Fujii | 359/690 |

FOREIGN PATENT DOCUMENTS 56-1009 1/1981 Japan.

*Primary Examiner*—Scott J. Sugarman
*Assistant Examiner*—Evelyn A. Lester
*Attorney, Agent, or Firm*—Fitzpatrick, Cella, Harper & Scinto

[57] ABSTRACT

A zoom lens comprises a first lens unit having a positive refractive power, a second lens group having a negative refractive power, an iris and a third lens unit having a positive refractive power, arranged in this sequence as viewed from an object. The third lens unit comprises a lens unit 3a and a lens unit 3b arranged in this sequence as viewed from the object, with a large air gap therebetween. Zooming from a short focal length end to a long focal length end is effected by moving the second lens group from a unit side to a image side and moving the first lens unit and the third lens unit to depict convex loci toward the object. The zoom lens meets the condition of $-0.3 < HF_3/f_3 < 0.2$
$0.5 < l_3/f_3 < 1.5$ where $HF_3$ is a distance between an apex of a lens of the third lens group facing the object and a front principal point of the third lens unit, $f_3$ is a focal length of the third lens unit, and $l_3$ is an air gap between the lens unit 3a and the lens unit 3b.

20 Claims, 9 Drawing Sheets

ZOOM LENS

BACKGROUND OF THE INVENTION

1. Field of the Invention

The present invention relates to a zoom lens and more particularly to a compact zoom lens having a high variation factor which is suitable to a still camera and a video camera.

2. Related Background Art

A compact zoom lens having a relatively high variation factor for use in a still camera or a video camera is proposed in Japanese Laid-Open Patent Application No. 56-1009. The disclosed zoom lens comprises a first lens group having a positive refractive power, a second lens group having a negative refractive power, an iris and a third lens group having a positive refractive power, arranged in this sequence as viewed from an object. The first lens group, the iris and the third lens group are reciprocally moved convexly to the object and the second lens group is monotonously moved from an object end to an image end when the lens is zoomed from a wide end to a telephoto end. In this manner, a compact zoom lens having a high variation factor is attained.

In order to attain a compact zoom lens having a high zoom ratio, refractive powers of movable lenses are increased and intervals between lenses are shortened as a usual method.

In the zoom lens described above, the compactness is attained by the above construction, the loci of movement and the narrow interval between the second lens group and the third lens group.

However, since a principal point of the third lens group facing the object is relatively close to the image plane, there is a limitation in narrowing the interval between the second lens group and the third lens group in order to reduce the size.

SUMMARY OF THE INVENTION

It is a first object of the present invention to provide a zoom lens having a high zoom ratio such as light.

It is a second object of the present invention to provide a zoom lens having a short total length and having aberration well compensated.

In accordance with a preferred embodiment of the present invention, the zoom lens comprises a first lens unit having a positive refractive power, a second lens unit having a negative refractive power and a third lens unit having a positive refractive power, arranged in the sequence as viewed from an object. As magnification varies from a short focal length end to a long focal length end, the second lens unit moves from an object end to an image end and the first lens unit and the third lens group move to depict convex loci toward the object. In the third lens unit, a lens unit $3a$ facing the object and a lens unit facing the image are arranged with a large air gap therebetween and to meet the following condition so that a compact zoom lens having a high variation factor is attained.

$$-0.3 < HF3/f_3 < 0.2 \tag{1}$$

$$0.5 < l_3/f_3 < 1.5 \tag{2}$$

More preferably, $$0.5 < |R_{3af}/R_{3ar}| < 1.5 \tag{3}$$

$$0.6 < |f_2|/f_s < 1.2 \tag{4}$$

where

HF3: a distance between an apex of a lens of the third lens group which faces the object and a front principal point of the second lens unit, $f_3$: a focal length of the third lens unit, $l_3$: an air gap between the lens unit $3a$ and the lens unit $3b$, $R_{3af}$: a radius of curvature of a lens of the lens unit $3a$ which faces the object, $R_{3ar}$: a radius of curvature of a lens of the lens unit $3a$ which faces the image, $f_2$: a focal length of the second lens unit, and $f_s$: a focal length of the entire system at the short focal length end An iris may be further arranged between the second lens unit and the third lens unit, and the iris and the third lens unit are moved to depict the convex loci toward the object so that the displacement of the first lens unit is reduced and the increase of the interval between the first lens unit and the iris when the magnification is varied, is kept at a minimum. As a result, a height of an off-axis light beam in the first lens unit is kept minimum and an effective diameter of the first lens unit is further reduced.

DETAILED DESCRIPTION OF THE PREFERRED EMBODIMENTS

Figure 1:
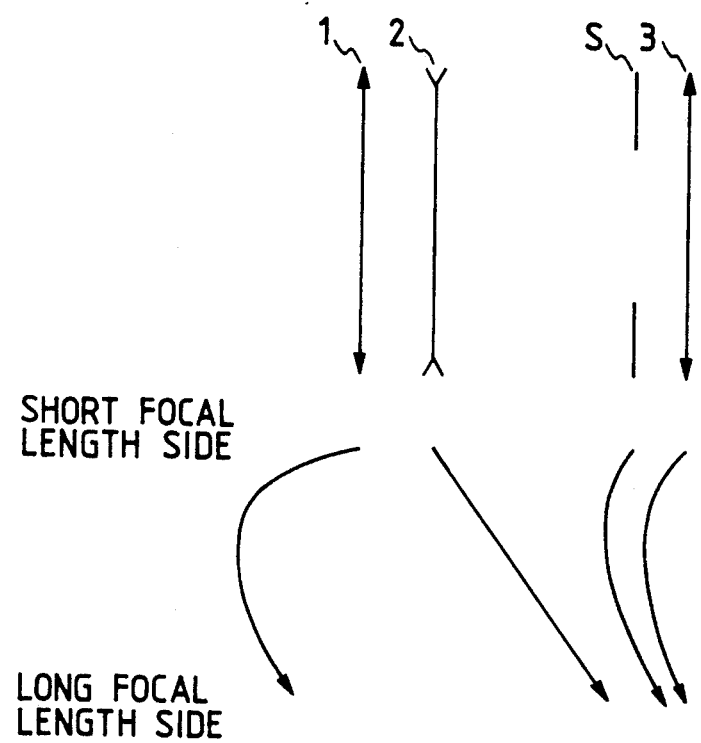
FIG. 1 shows an arrangement for a near-axis refractive power of the present invention.
Figure 2:
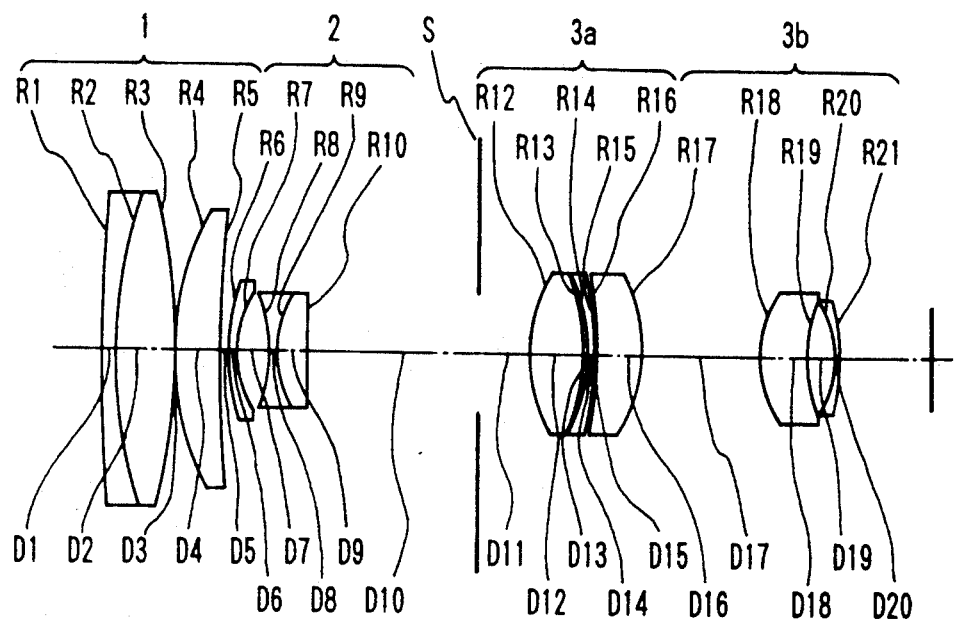
FIG. 2 shows a sectional view of a lens in accordance with numerical example 1.
Figure 3:
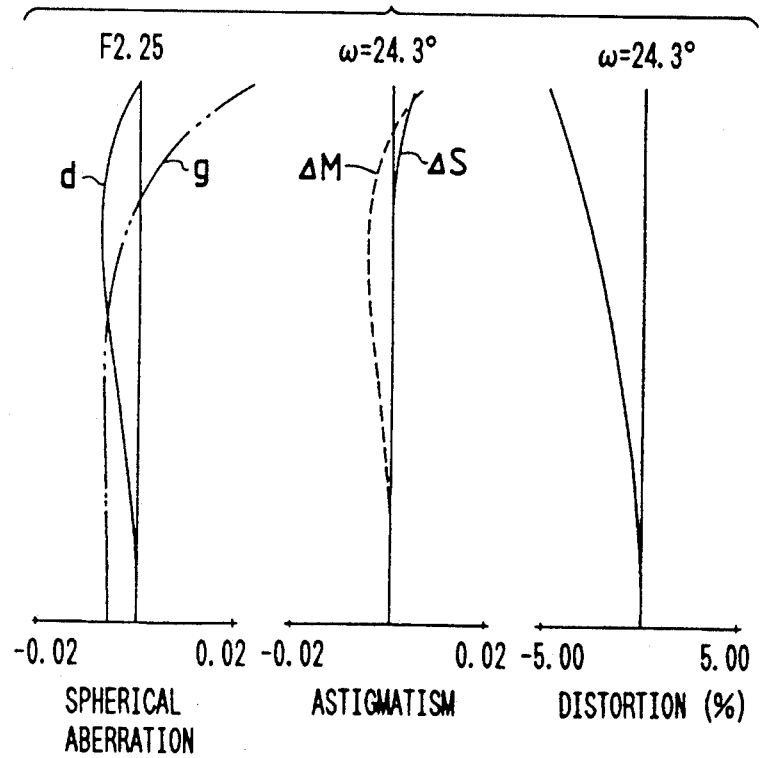
FIG. 3 shows aberrations at a mode end of the numerical example 1.
Figure 4:
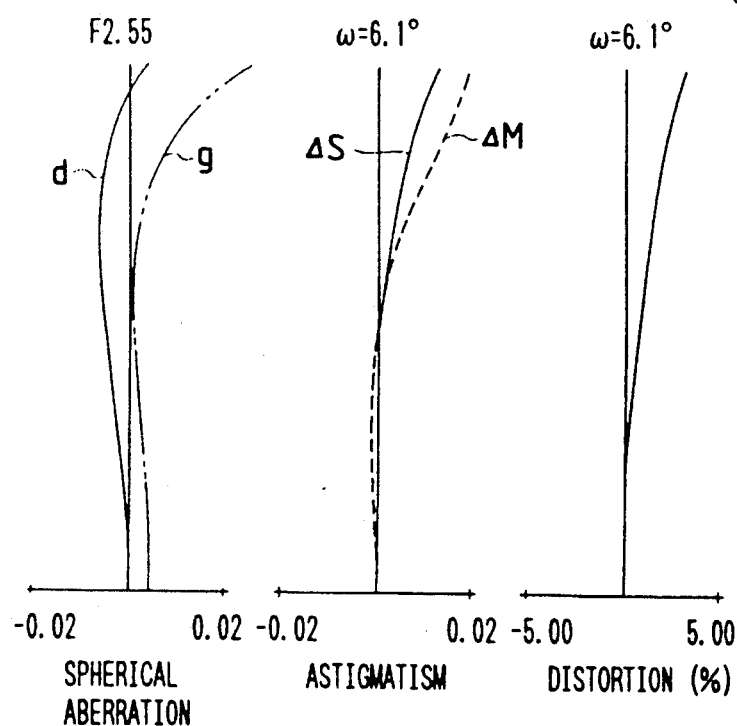
FIG. 4 shows aberrations at a middle zoom position of the numerical example 1.
Figure 5:
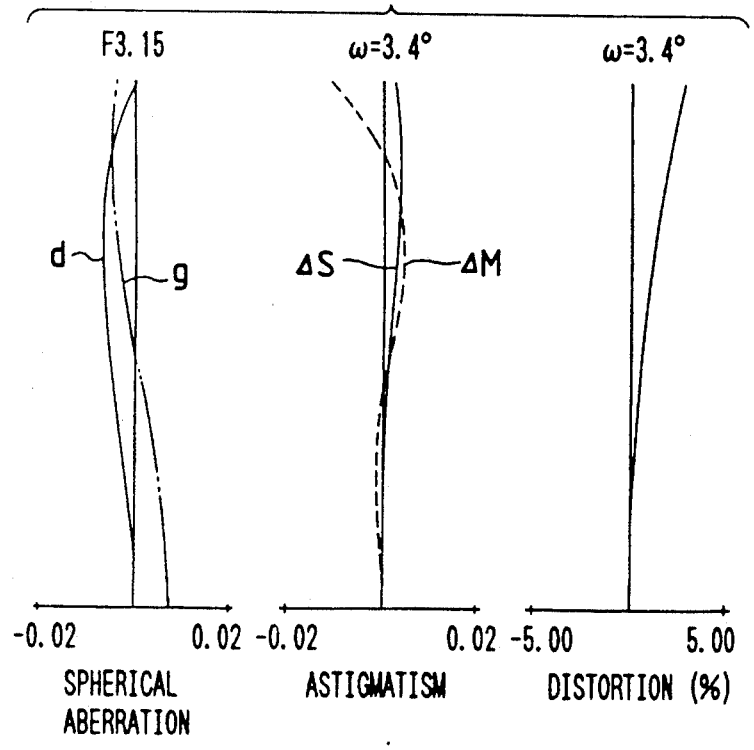
FIG. 5 shows aberrations at a telephoto end of the numerical example 1.
Figure 6:
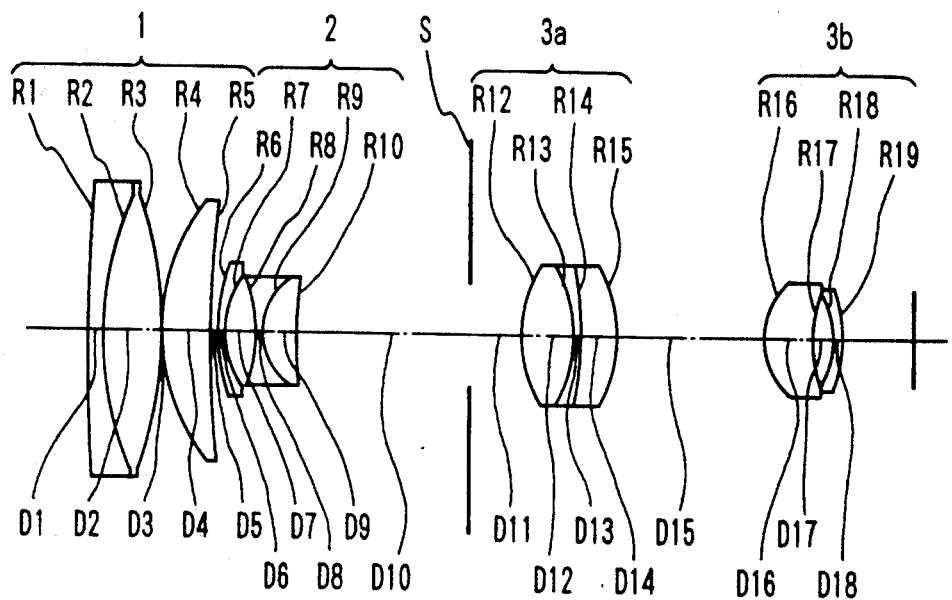
FIG. 6 shows a sectional view of a lens in accordance with numerical example 2.
Figure 7:
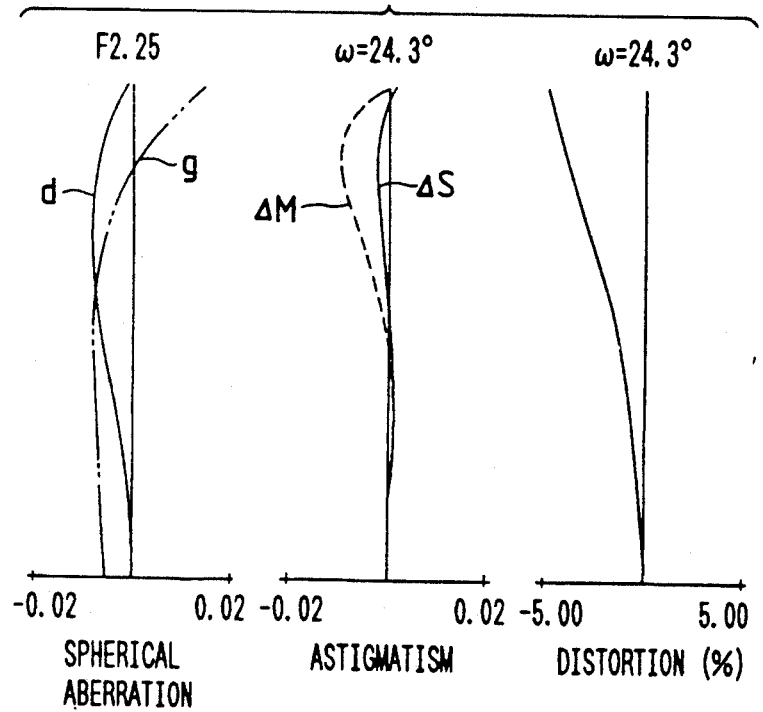
FIG. 7 shows aberrations at a wide end of the numerical example 2.
Figure 8:
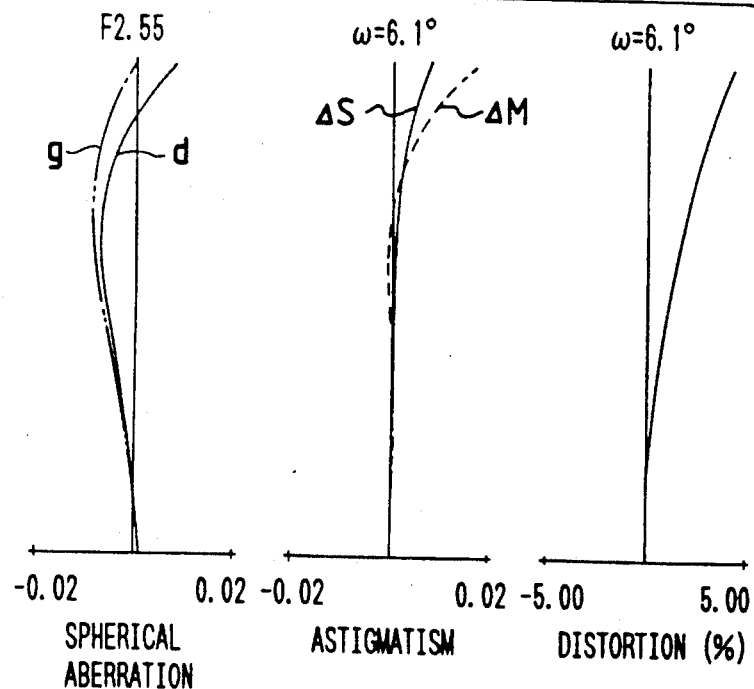
FIG. 8 shows aberrations at a middle zoom position of the numerical example 2.
Figure 9:
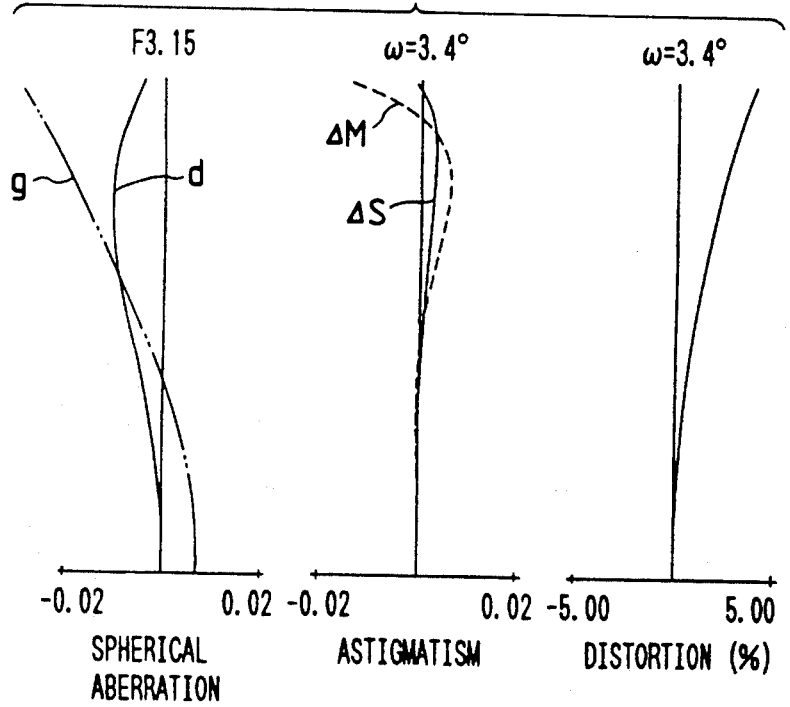
FIG. 9 shows aberrations at a telephoto end of the numerical example 2.
Figure 10:
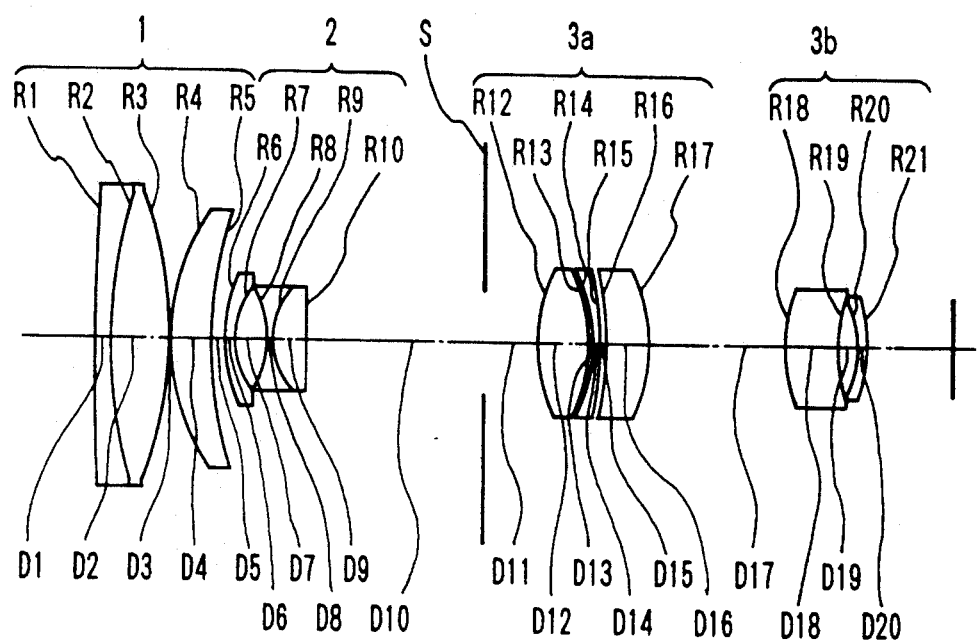
FIG. 10 shows a sectional view of a lens in accordance with numerical example 3 of the present invention.
Figure 11:
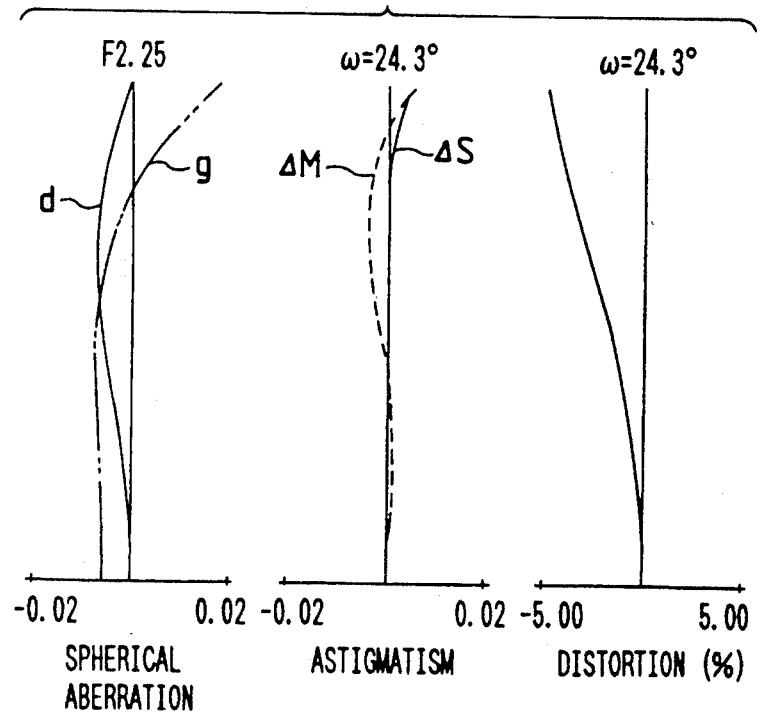
FIG. 11 shows aberrations at a wide end of the numerical example 3.
Figure 12:
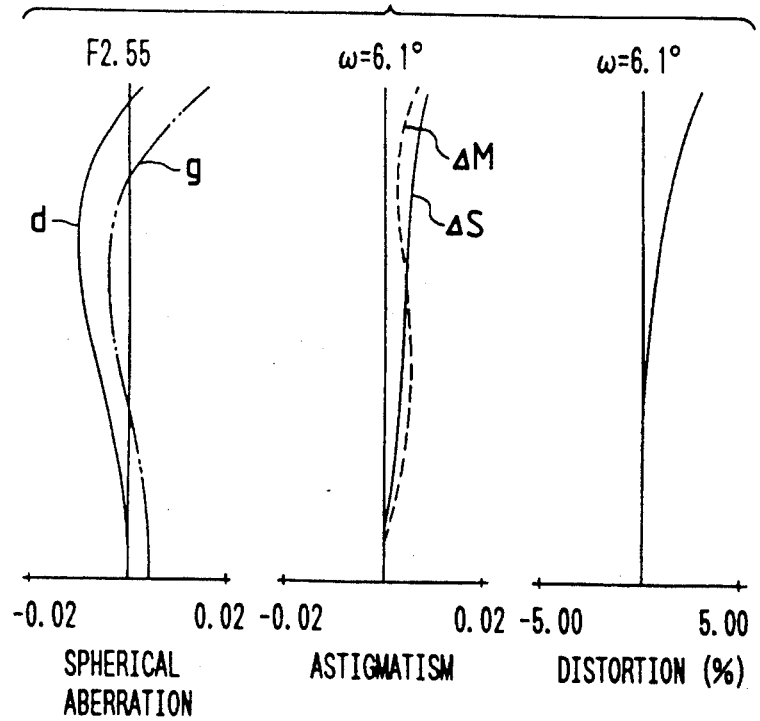
FIG. 12 shows aberrations at a middle zoom position of the numerical example 3.
Figure 13:
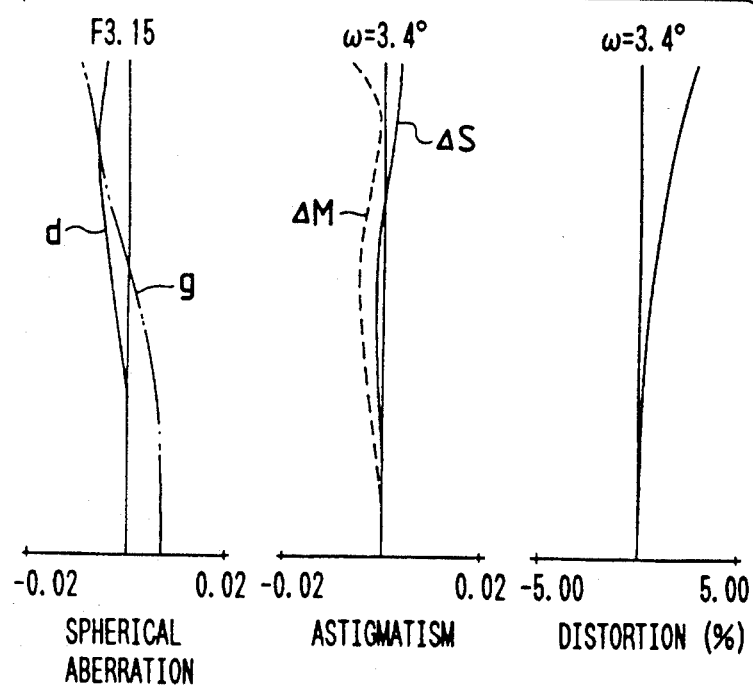
FIG. 13 shows aberrations at a telephoto end of the numerical example 3.
Figure 14:
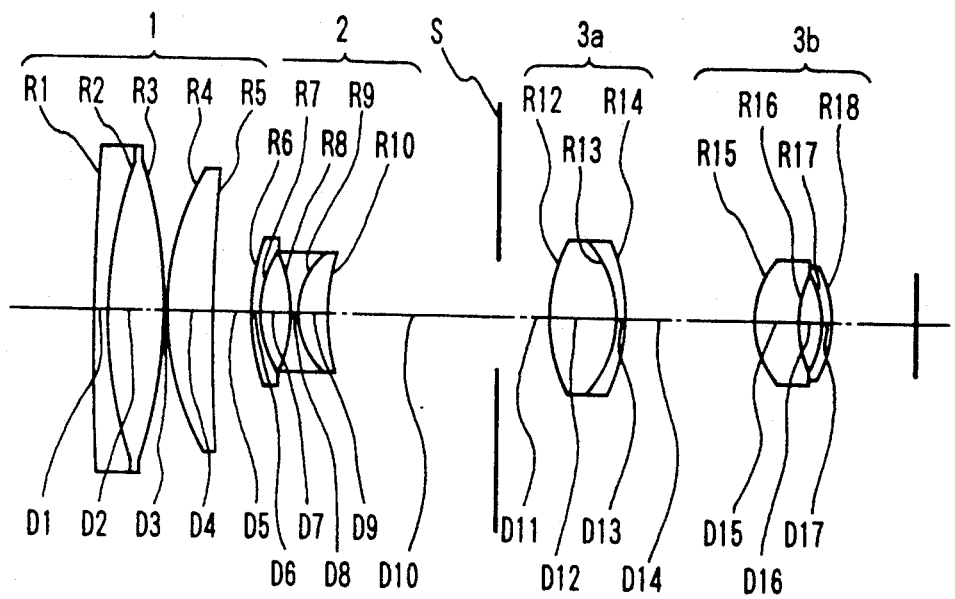
FIG. 14 shows a sectional view of a lens in accordance with numerical example 4 of the present invention.
Figure 15:
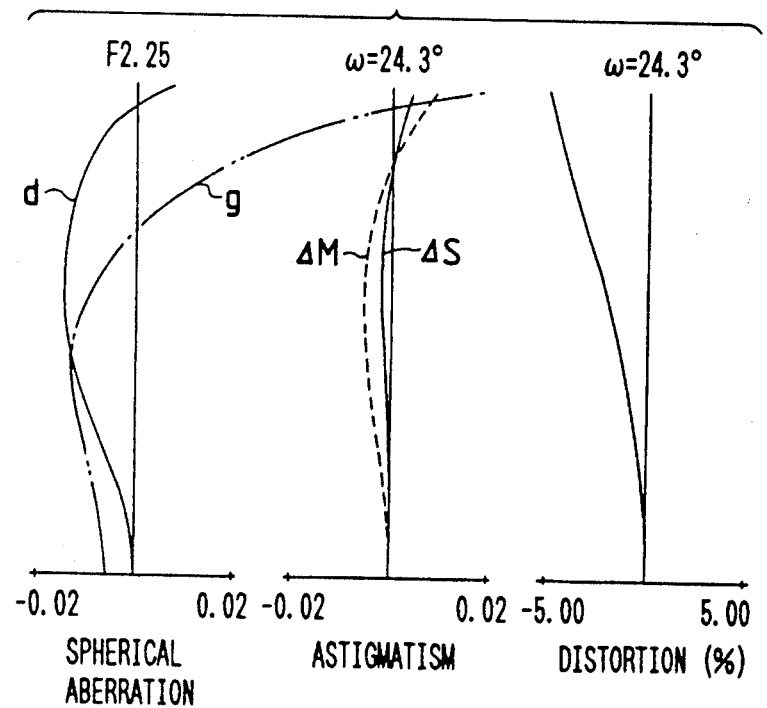
FIG. 15 shows aberrations at a wide end of the numerical example 4.
Figure 16:
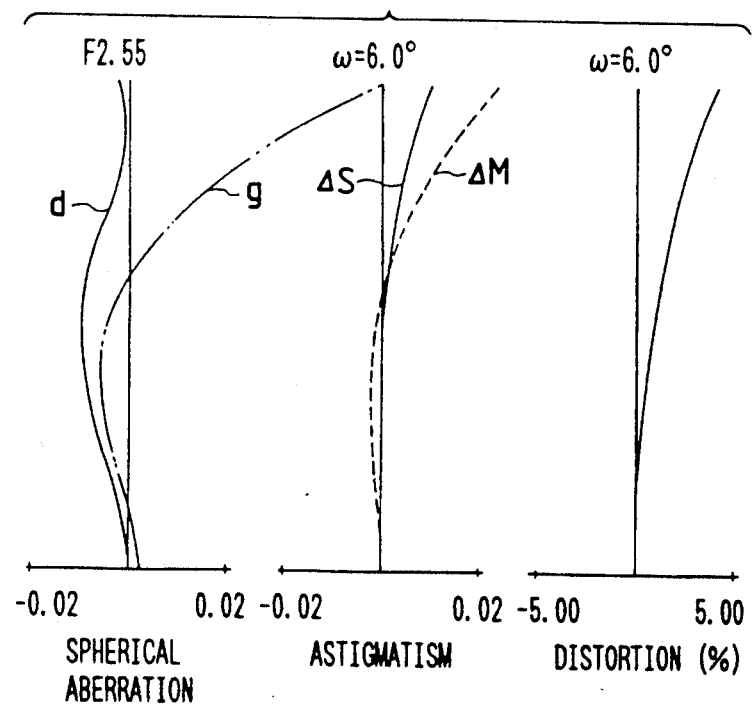
FIG. 16 shows aberrations at a middle zoom position of the numerical example 4.
Figure 17:
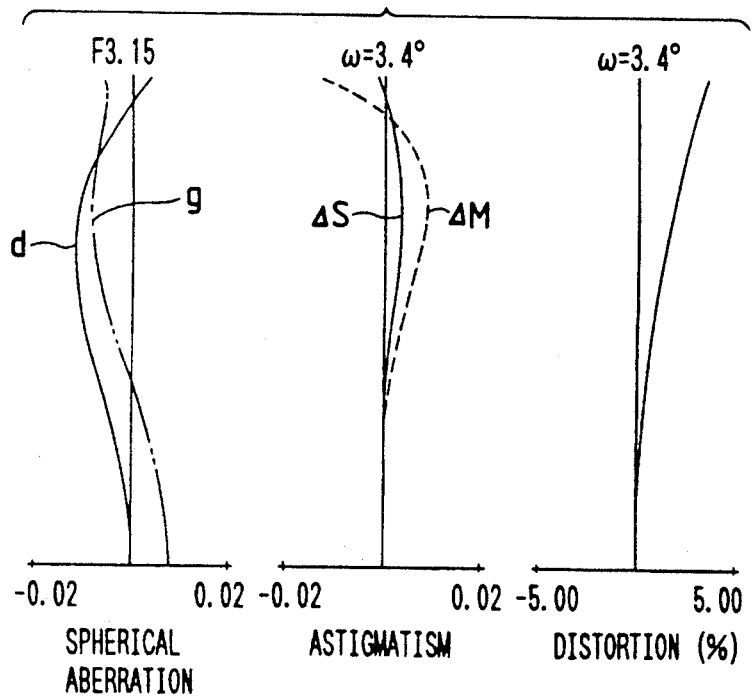
FIG. 17 shows aberrations at a telephoto end of the numerical embodiment 4.

FIG. 1 shows a near-axis arrangement of a zoom lens of the present invention and loci of movement thereof. Numeral 1 denotes a first lens unit having a positive refractive power which moves with a convex locus toward an object as the magnification varies from a short focal length end to a long focal length end, and numeral 2 denotes a second lens unit having a negative refractive power which monotonously moves toward an image. S denotes an aperture iris which moves with a convex locus toward the object, and numeral 3 denotes a third lens unit having a positive refractive power which moves with a convex locus toward the object. In the present embodiment, the first lens unit 1 and the third lens unit 3 primarily play a role of a compensator for keeping the image plane constant so that the displacement of the first lens unit is reduced. The iris S and the third lens unit 3 are moved convexly toward the object so that the increase of the interval between the first lens unit 1 and the iris S, when the magnification is varied, is minimized and a height of an off-axis light beam of the first lens unit is minimized to reduce the effective diameter of the first lens unit. Further, a total length of the zoom lens is reduced over the entire focal length range by the reduction of the displacement of the first lens unit and the reduction of a center thickness of the first lens unit due to the reduction of the effective diameter of the first lens group.

The present embodiment provides a zoom lens having a high variation factor while it reduces the overall size of the lens by meeting the condition formulas (1) to (4).

Technical significance of each condition formula is explained below.

The condition formula (1) indicates a ratio of the interval between the apex of the lens of the third lens unit which is closest to the object and the front principal point to the focal length of the third lens unit. If the upper limit of the condition formula (1) is exceeded, the interval between the principal points of the second lens unit and the third lens unit at the long focal length end is relatively long and the total length of the lens becomes long. On the other hand, if the lower limit of the condition formula is exceeded, then the negative power of the lens unit 3b increases and the compensation of a coma aberration is difficult to attain.

The condition formula (2) indicates a ratio of the interval between the lens group 3a and the lens unit 3b to the focal length of the third lens unit. If the upper limit of the condition formula is exceeded, a back focus tends to reduce. Thus, if dust deposits on the lens surface of the lens unit 3b, it tends to prominently appears on the image plane. Further, it is difficult to secure a space to arrange an optical element such as a low pass filter in the back focus. On the other hand, if the lower limit of the condition formula is exceeded, the interval between the lens unit 3a and the lens unit 3b is reduced and it is difficult to fully compensate for off-axis aberration.

The condition formula (3) indicates a ratio of radii of curvature of a lens of the lens unit 3a which faces the image and a lens which faces the object. If the upper limit or the lower limit of the condition formula is exceeded, it is difficult to compensate the variation of the special aberration when the lens is zoomed.

The condition formula (4) indicates a ratio of the focal length of the second lens unit to the focal length of the entire system at the short focal length end. If the upper limit of the condition formula is exceeded, the displacement of the second lens unit, to attain a desired zoom ratio, increases and the total length of the lens increases. On the other hand, if the lower limit of the condition formula is exceeded, the negative refractive power of the second lens unit increases and it is difficult to compensate for image plane curve aberration.

The objects of the present invention are achieved by the above arrangement. More preferably, the lens unit 3b comprises a meniscus positive lens having a convex plane facing the object and a meniscus negative lens having a convex plane facing the image. By such an arrangement of the lens unit 3b, the front principal point of the third lens unit can approach the object without deteriorating the aberrations.

The first lens unit, the iris S and the third lens unit are preferably movable independently from the others. Where those lens units are movable independently, the height of the off-axis light beam directed to the third lens unit is kept substantially constant over the entire magnification area and the aberration of the off-axis light beam is minimized.

It is preferable to use at least one aspherical plane in each of the lenses of the first lens unit and the third lens unit. When the aspherical plane is included in the first lens unit, a coma aberration and a distortion aberration are well compensated. When the aspherical plane is included in the third lens, the aspherical aberration can be readily compensated. By the use of the aspherical plane, the number of lenses can be reduced and the total length can be reduced, and the cost can also be reduced.

It is preferable that maximum values of the refractive indices of the positive lenses of the first lens unit and the third lens unit are no greater than 1.6. When the refractive index is greater than 1.6, the image plane curve aberration is too much.

It is preferable to meet a condition $$0.6 < |f_2|/I < 1.5 \qquad (5)$$

where I is an image size.

This condition formula indicates a ratio of the focal length of the second lens unit to the image circle. If the lower limit is exceeded, the negative refraction is too strong and the negative Petzval sum of the entire system increases in the negative direction making it difficult to compensate the image plane curve. On the other hand, if the upper limit is exceeded, the negative refractive power of the second lens unit is too weak and the displacement of the second lens unit to attain the desired magnification ratio increases, and the total length of the lens increases.

Numerical examples of the present invention are shown below.

In the numerical examples, Ri denotes a radius of curvature of an i-th lens as viewed from the object, Di denotes a thickness of the i-th lens and an air gap, and Ni and Vi denote a refractive index and an Abbe number of the i-th lens.

A formula representing an aspherical plane is given by $$X = \frac{H^2/R}{1 + \sqrt{1 - H^2/R^2}} + AH^2 + BH^4 + CH^6 + DH^8 + EH^{10}$$

where X is a deviation from a contact plane at a radius H, R is a near-axis radius of curvature, and A, B, C, D and E are aspherical coefficients in the respective orders, E-4 of the aspherical coefficient represents $10^{-4}$.

NUMERICAL EXAMPLE 1

$F = 1 \sim 7.6$  FNO = 1:2.25~3.15  $2\omega 48.6 \sim 6.8$

| | | | |
|---|---|---|---|
| R1 = 10.8416 | D1 = 0.1389 | N1 = 1.80518 | ν1 = 25.4 |
| R2 = 3.7550 | D2 = 0.5278 | N2 = 1.51633 | ν2 = 64.1 |
| R3 = −6.1461 | D3 = 0.0278 | | |
| R4 = 2.3346 | D4 = 0.4028 | N3 = 1.49171 | ν3 = 57.4 |
| R5 = 8.6334 | D5 = variable | | |
| R6 = 1.9804 | D6 = 0.0694 | N4 = 1.83400 | ν4 = 37.2 |
| R7 = 0.9218 | D7 = 0.2911 | | |
| R8 = −1.1804 | D8 = 0.0694 | N5 = 1.77250 | ν5 = 49.6 |
| R9 = 0.8565 | D9 = 0.2917 | N6 = 1.84666 | ν6 = 23.9 |
| R10 = 11.5347 | D10 = variable | | |
| R11 = (iris) | D11 = variable | | |
| R12 = 1.1641 | D12 = 0.4901 | N7 = 1.49171 | ν7 = 57.4 |
| R13 = −1.8969 | D13 = 0.0395 | | |
| R14 = −1.4583 | D14 = 0.0694 | N8 = 1.84666 | ν8 = 23.9 |
| R15 = −3.8700 | D15 = 0.0278 | | |
| R16 = −6.0276 | D16 = 0.4167 | N9 = 1.51633 | ν9 = 64.1 |
| R17 = −1.5302 | D17 = 1.1111 | | |
| R18 = 0.9430 | D18 = 0.4672 | N10 = 1.49171 | ν10 = 57.4 |
| R19 = 1.9249 | D19 = 0.2094 | | |
| R20 = −0.9191 | D20 = 0.0694 | N11 = 1.84666 | ν11 = 23.9 |
| R21 = −1.5586 | | | |

| variable gap | focal length | | | Plane number | Aspherical coefficient | | | | |
|---|---|---|---|---|---|---|---|---|---|
| | 1.00 | 4.25 | 7.60 | | A | B | C | D | E |
| D5 | 0.11 | 1.95 | 2.43 | 4 | 0 | −1.2596E-3 | −3.00909E-4 | −8.26695E-5 | 0 |
| D10 | 1.64 | 0.72 | 0.20 | 12 | 0 | −1.00558E-1 | −2.61664E-2 | −2.58536E-2 | 0 |
| D11 | 0.48 | 0.34 | 0.20 | 19 | 0 | 1.08675E-1 | 1.84555E-1 | −1.04384 | 0 |

TABLE 1

| Item | Focal length | | | Item | Value |
|---|---|---|---|---|---|
| | 1 | 4.247 | 7.6 | | |
| $e_1$ | 0.694 | 2.528 | 3.01 | $f_1$ | 4.194 |
| $e_{21}$ | 1.927 | 1.003 | 0.486 | $f_2$ | −0.833 |
| $e_{22}$ | 0.486 | 0.347 | 0.208 | $f_3$ | 1.518 |
| TL | 7.836 | 8.985 | 8.433 | $HF_3$ | 0.005 |
| | | | | $HF_3/f_3$ | 0.003 |
| | | | | $l_3/f_3$ | 0.732 |
| | | | | $|R_{3af}/R_{3ar}|$ | 0.761 |
| | | | | $|f_2|/f_s$ | 0.833 |
| | | | | K1 | 2.6 |
| | | | | $n_{1Gmax}$ | 1.51633 |
| | | | | $n_{3Gmax}$ | 1.51633 |

NUMERICAL EXAMPLE 2

$F = 1 \sim 7.6$  FNO = 1:2.25~3.15  $2\omega 48.6 \sim 6.8$

| | | | |
|---|---|---|---|
| R1 = 17.9276 | D1 = 0.1389 | N1 = 1.80518 | ν1 = 25.4 |
| R2 = 3.6887 | D2 = 0.5278 | N2 = 1.49171 | ν2 = 57.4 |
| R3 = −4.6165 | D3 = 0.0278 | | |
| R4 = 2.2349 | D4 = 0.4028 | N3 = 1.49171 | ν3 = 57.4 |
| R5 = 8.8996 | D5 = variable | | |
| R6 = 1.7127 | D6 = 0.0694 | N4 = 1.83400 | ν4 = 37.2 |
| R7 = 1.0418 | D7 = 0.2911 | | |
| R8 = −1.3543 | D8 = 0.0694 | N5 = 1.77250 | ν5 = 49.6 |
| R9 = 0.6476 | D9 = 0.2917 | N6 = 1.84666 | ν6 = 23.9 |
| R10 = 2.4861 | D10 = variable | | |
| R11 = (iris) | D11 = variable | | |
| R12 = 1.1124 | D12 = 0.4901 | N7 = 1.49171 | ν7 = 57.4 |
| R13 = −1.4505 | D13 = 0.0694 | N8 = 1.84666 | ν8 = 23.9 |
| R14 = −4.5319 | D14 = 0.3195 | N9 = 1.49171 | ν9 = 57.4 |
| R15 = −1.5027 | D15 = 1.3860 | | |
| R16 = 0.8324 | D16 = 0.4243 | N10 = 1.49171 | ν10 = 57.4 |
| R17 = 1.2798 | D17 = 0.2091 | | |
| R18 = −0.8914 | D18 = 0.0694 | N11 = 1.84666 | ν11 = 23.9 |
| R19 = −1.3397 | | | |

| variable gap | focal length | | | Plane number | Aspherical coefficient | | | | |
|---|---|---|---|---|---|---|---|---|---|
| | 1.00 | 4.30 | 7.60 | | A | B | C | D | E |
| D5 | 0.09 | 1.92 | 2.41 | 4 | 0 | −1.78604E-3 | −2.1456E-4 | −1.94715E-4 | 0 |
| D10 | 1.60 | 0.67 | 0.16 | 12 | 0 | −1.44964E-1 | −6.12949E-2 | −2.96888E-2 | 0 |
| D11 | 0.48 | 0.34 | 0.20 | 17 | 0 | 2.34802E-1 | 2.59415E-1 | 3.33486E-1 | 0 |

TABLE 2

| | Focal length | | | | | 
|---|---|---|---|---|---|
| Item | 1 | 4.304 | 7.6 | Item | Value |
| $e_1$ | 0.694 | 2.528 | 3.010 | $f_1$ | 4.194 |
| $e_{21}$ | 1.788 | 0.864 | 0.347 | $f_2$ | −0.833 |
| $e_{22}$ | 0.479 | 0.347 | 0.208 | $f_3$ | 1.458 |
| TL | 7.616 | 8.770 | 8.213 | $HF_3$ | 0.0072 |
| | | | | $HF_3/f_3$ | 0.005 |
| | | | | $l_3/f_3$ | 0.951 |
| | | | | $|R_{3af}/R_{3ar}|$ | 0.740 |
| | | | | $|f_2|/f_s$ | 0.833 |
| | | | | K1 | 2.67 |
| | | | | $n_{1Gmax}$ | 1.49171 |
| | | | | $n_{3Gmax}$ | 1.49171 |

TABLE

| | Focal length | | | | |
|---|---|---|---|---|---|
| Item | 1 | 4.247 | 7.6 | Item | Value |
| $e_1$ | 0.694 | 2.528 | 3.010 | $f_1$ | 4.194 |
| $e_{21}$ | 1.927 | 1.003 | 0.486 | $f_2$ | −0.833 |
| $e_{22}$ | 0.486 | 0.347 | 0.208 | $f_3$ | 1.518 |
| TL | 7.927 | 9.076 | 8.524 | $HF_3$ | 0.002 |
| | | | | $HF_3/f_3$ | 0.001 |
| | | | | $l_3/f_3$ | 0.822 |
| | | | | $|R_{3af}/R_{3ar}|$ | 0.867 |
| | | | | $|f_2|/f_s$ | 0.833 |
| | | | | K1 | 2.7 |
| | | | | $n_{1Gmax}$ | 1.51633 |
| | | | | $n_{3Gmax}$ | 1.51633 |

NUMERICAL EXAMPLE 3

F = 1~7.6    FNO = 1:2.25~3.15    2ω48.6~6.8

| R1 = 31.4347 | D1 = 0.1389 | N1 = 1.80518 | ν1 = 25.4 |
|---|---|---|---|
| R2 = 4.7676 | D2 = 0.5278 | N2 = 1.51633 | ν2 = 64.1 |
| R3 = −4.4980 | D3 = 0.0278 | | |
| R4 = 2.0589 | D4 = 0.4028 | N3 = 1.49171 | ν3 = 57.4 |
| R5 = 5.4294 | D5 = variable | | |
| R6 = 1.9414 | D6 = 0.0694 | N4 = 1.83400 | ν4 = 37.2 |
| R7 = 0.9360 | D7 = 0.2911 | | |
| R8 = −1.1284 | D8 = 0.0694 | N5 = 1.77250 | ν5 = 49.6 |
| R9 = 0.8463 | D9 = 0.2917 | N6 = 1.84666 | ν6 = 23.9 |
| R10 = 12.2571 | D10 = variable | | |
| R11 = (iris) | D11 = variable | | |
| R12 = 1.2488 | D12 = 0.4901 | N7 = 1.49171 | ν7 = 57.4 |
| R13 = −1.7824 | D13 = 0.0356 | | |
| R14 = −1.4309 | D14 = 0.0694 | N8 = 1.84666 | ν8 = 23.9 |
| R15 = −3.5921 | D15 = 0.0278 | | |
| R16 = −6.4673 | D16 = 0.4167 | N 9 = 1.51633 | ν9 = 64.1 |
| R17 = −1.4396 | D17 = 1.2477 | | |
| R18 = 1.1735 | D18 = 0.5181 | N10 = 1.49171 | ν10 = 57.4 |
| R19 = 3.4010 | D19 = 0.1755 | | |
| R20 = −0.9551 | D20 = 0.0694 | N11 = 1.84666 | ν11 = 23.9 |
| R21 = −1.6966 | | | |

| variable gap | focal length | | | Plane number | Aspherical coefficient | | | | |
|---|---|---|---|---|---|---|---|---|---|
| | 1.00 | 4.25 | 7.60 | | A | B | C | D | E |
| D5 | 0.14 | 1.97 | 2.45 | 4 | 0 | −3.4669E - 3 | −4.26381E - 4 | −3.57509E - 4 | 0 |
| D10 | 1.65 | 0.72 | 0.21 | 12 | 0 | −1.12648E - 1 | −3.98839E - 2 | −1.25664E - 2 | 0 |
| D11 | 0.48 | 0.35 | 0.21 | | | | | | |

NUMERICAL EXAMPLE 4

F = 1~7.6    FNO = 1:2.25~3.15    2ω48.6~6.8

| R1 = 19.2247 | D1 = 0.1389 | N1 = 1.80518 | ν1 = 25.4 |
|---|---|---|---|
| R2 = 3.7417 | D2 = 0.5278 | N2 = 1.49171 | ν2 = 57.4 |
| R3 = −4.4861 | D3 = 0.0278 | | |
| R4 = 2.2375 | D4 = 0.4028 | N3 = 1.49171 | ν3 = 57.4 |
| R5 = 8.6842 | D5 = variable | | |
| R6 = 1.7523 | D6 = 0.0694 | N4 = 1.83400 | ν4 = 37.2 |
| R7 = 1.0309 | D7 = 0.2911 | | |
| R8 = −1.3059 | D8 = 0.0694 | N5 = 1.77250 | ν5 = 49.6 |
| R9 = 0.6634 | D9 = 0.2917 | N6 = 1.84666 | ν6 = 23.9 |
| R10 = 2.8447 | D10 = variable | | |
| R11 = (iris) | D11 = variable | | |
| R12 = 1.1433 | D12 = 0.6667 | N7 = 1.49171 | ν7 = 57.4 |
| R13 = −0.8594 | D13 = 0.0694 | N8 = 1.84666 | ν8 = 23.9 |
| R14 = −1.4786 | D14 = 1.2084 | | |
| R15 = 0.8386 | D15 = 0.4243 | N9 = 1.49171 | ν9 = 57.4 |
| R16 = 1.3467 | D16 = 0.2091 | | |
| R17 = −0.9075 | D17 = 0.0694 | N10 = 1.84666 | ν10 = 23.9 |
| R18 = −1.3215 | | | |

| variable gap | focal length | | | Plane number | Aspherical coefficient | | | | |
|---|---|---|---|---|---|---|---|---|---|
| | 1.00 | 4.30 | 7.60 | | A | B | C | D | E |
| D5 | 0.11 | 1.94 | 2.42 | 4 | 0 | −1.97151E - 3 | −3.08107E - 4 | −1.72207E - 4 | 0 |
| D10 | 1.59 | 0.66 | 0.14 | 12 | 0 | −5.09175E - 2 | −9.03499E - 2 | 2.23981E - 1 | 0 |
| D11 | 0.48 | 0.34 | 0.20 | 16 | 0 | 2.65684E - 1 | 3.58555E - 1 | 2.07345E - 1 | 0 |

TABLE 4

| Item | Focal length 1 | 4.304 | 7.6 | Item | Value |
|---|---|---|---|---|---|
| $e_1$ | 0.694 | 2.528 | 3.01 | $f_1$ | 4.194 |
| $e_{21}$ | 1.788 | 0.864 | 0.347 | $f_2$ | −0.833 |
| $e_{22}$ | 0.486 | 0.347 | 0.208 | $f_3$ | 1.458 |
| TL | 7.431 | 8.585 | 8.028 | $HF_3$ | 0.010 |
| | | | | $HF_3/f_3$ | 0.007 |
| | | | | $l_3/f_3$ | 0.829 |
| | | | | $|R_{3af}/R_{3ar}|$ | 0.773 |
| | | | | $|f_2|/f_s$ | 0.833 |
| | | | | K1 | 2.705 |
| | | | | $n_{1Gmax}$ | 1.49171 |
| | | | | $n_{3Gmax}$ | 1.49171 |

In the examples, a maximum effective diameter K1 of the first lens unit is 2.6–2.7, and a minimum effective diameter which is determined by a ratio to the focal length at the long focal length end, is approximately 2.4 which is close to the maximum effective diameter K1. The total length TL of the lens (the length from the lens front plane to the focal plane) is also close to the focal length at the long focal length and over the entire magnification range, and the compactness is fairly attained in the zoom lens having the high zoom ratio of 8.

In the Example 2, all positive lenses of the first lens unit and the third lens unit are resin (PMMA) lenses and the lens group 3a is the cemented lens. Thus, the size as well as the cost are significantly reduced.

In the Examples 1, 2 and 4, three aspherical planes are used, and in the Example 3, two aspherical planes are used to attain a good optical characteristic.

In the Example 4, the third lens group comprises only four lenses and a relatively good optical characteristic is attained.

In accordance with the present invention, while the magnification variation factor is as high as eight, the diameter of the first lens unit and the total length are small and the zoom lens has a good compensation to the aberration. Further, since the positive lenses of the first lens unit and the third lens unit are glass or resin lenses having low refractive indices, a very inexpensive, compact and high performance zoom lens is attained.

What is claimed is:

1. A zoom lens comprising:
a first lens unit having a positive refractive power, a second lens unit having a negative refractive power, and a third lens unit having a positive refractive power, arranged in this sequence as viewed from an object;
said second lens unit being moved from an object side to an image side and said first lens unit and said third lens unit being moved to depict convex loci toward the object, as a magnification of said zoom lens is varied from a short focal length end to a long focal length end;
said third lens unit having a lens unit 3a and a lens unit 3b facing the image, arranged with a large air gap therebetween;
said zoom lens meeting a condition of:

$$-0.3 < HF_3/f_3 < 0.2$$

$$0.5 < l_3/f_3 < 1.5$$

where
$HF_3$ is a distance between an apex of a lens of said third lens unit facing the object and a front principal point of said third lens unit,
$f_3$ is a focal length of said third lens unit, and
$l_3$ is an air gap between said lens unit 3a and said lens unit 3b.

2. A zoom lens according to claim 1 wherein the following condition is met:

$$0.5 < |R_{3af}/R_{3ar}| < 1.5$$

$$0.6 < |f_2|/f_s < 1.2$$

where
$R_{3af}$ is a radius of curvature of a lens of said lens unit 3a facing the object,
$R_{3ar}$ is a radius of curvature of a lens of said lens unit 3a facing the image,
$f_2$ is a focal length of said second lens unit, and
$f_s$ is a focal length of the entire system at the short focal length end.

3. A zoom lens according to claim 2 further comprising an iris arranged between said second lens unit and said third lens unit,
said iris being movable to depict a convex locus toward the object when the magnification of said zoom lens is varied from the short focal length end to the long focal length end.

4. A zoom lens according to claim 2 wherein said lens unit 3b comprises a meniscus positive lens having a convex plane facing the object and a meniscus negative lens having a convex plane facing the image, arranged in this sequence as viewed from the object.

5. A zoom lens according to claim 2, further comprising an iris, wherein said first lens unit, said iris, and said third lens unit are movable independently from each other.

6. A zoom lens according to claim 3 wherein said first lens unit, said iris, and said third lens unit are movable independently from each other.

7. A zoom lens according to claim 6 wherein each of said first lens unit and said third lens unit includes at least one aspherical plane.

8. A zoom lens according to claim 7 wherein the following condition is met:

$$n_{1Gmax} < 1.6$$

$$n_{3Gmax} < 1.6$$

where $n_{1Gmax}$ is a maximum refractive index of the positive lens in said first lens unit, and $n_{3Gmax}$ is a maximum refractive index of the positive lens in said third lens unit.

9. A zoom lens according to claim 3 wherein each of said first lens unit and said third lens unit includes at least one aspherical plane.

10. A zoom lens according to claim 9 wherein the following condition is met:

$$n_{1Gmax} < 1.6$$

$$n_{3Gmax} < 1.6$$

where $n_{1Gmax}$ is a maximum refractive index of the positive lens in said first lens unit, and $n_{3Gmax}$ is a maximum refractive index of the positive lens in said third lens unit.

11. A zoom lens according to claim 3 wherein the following condition is met:

$$n_{1Gmax} < 1.6$$

$$n_{3Gmax} < 1.6$$

where $n_{1Gmax}$ is a maximum refractive index of the positive lens in said first lens unit, and $n_{3Gmax}$ is a maximum refractive index of the positive lens in said third lens unit.

12. A zoom lens according to claim 4 wherein each of said first lens unit and said third lens group includes at least one aspherical plane.

13. A zoom lens according to claim 12 wherein the following condition is met:

$$n_{1Gmax} < 1.6$$

$$n_{3Gmax} < 1.6$$

where $n_{1Gmax}$ is a maximum refractive index of the positive lens in said first lens unit, and $n_{3Gmax}$ is a maximum refractive index of the positive lens in said third lens unit.

14. A zoom lens according to claim 4 wherein the following condition is met:

$$n_{1Gmax} < 1.6$$

$$n_{3Gmax} < 1.6$$

where $n_{1Gmax}$ is a maximum refractive index of the positive lens in said first lens unit, and $n_{3Gmax}$ is a maximum refractive index of the positive lens in said third lens unit.

15. A zoom lens according to claim 5 wherein each of said first lens unit and said third lens unit includes at least one aspherical plane.

16. A zoom lens according to claim 15 wherein the following condition is met:

$$n_{1Gmax} < 1.6$$

$$n_{3Gmax} < 1.6$$

where $n_{1Gmax}$ is a maximum refractive index of the positive lens in said first lens group, and $n_{3Gmax}$ is a maximum refractive index of the positive lens in said third lens unit.

17. A zoom lens according to claim 5 wherein the following condition is met:

$$n_{1Gmax} < 1.6$$

$$n_{3Gmax} < 1.6$$

where $n_{1Gmax}$ is a maximum refractive index of the positive lens in said first lens unit, and $n_{3Gmax}$ is a maximum refractive index of the positive lens in said third lens unit.

18. A zoom lens according to claim 2 wherein each of said first lens unit and said third lens unit includes at least one aspherical plane.

19. A zoom lens according to claim 18 wherein the following condition is met:

$$n_{1Gmax} < 1.6$$

$$n_{3Gmax} < 1.6$$

where $n_{1Gmax}$ is a maximum refractive index of the positive lens in said first lens unit, and $n_{3Gmax}$ is a maximum refractive index of the positive lens in said third lens unit.

20. A zoom lens according to claim 2 wherein the following condition is met:

$$n_{1Gmax} < 1.6$$

$$n_{3Gmax} < 1.6$$

where $n_{1Gmax}$ is a maximum refractive index of the positive lens in said first lens unit, and $n_{3Gmax}$ is a maximum refractive index of the positive lens in said third lens unit.

* * * * *

UNITED STATES PATENT AND TRADEMARK OFFICE
CERTIFICATE OF CORRECTION

PATENT NO. : 5,247,393
DATED : September 21, 1993
INVENTOR(S) : SABURO SUGAWARA

It is certified that error appears in the above-indentified patent and that said Letters Patent is hereby corrected as shown below:

COLUMN 1
    line 42, "such as light" should read --such as eight--.

COLUMN 2
    line 24, "iris" should read --iris,--.

COLUMN 3
    line 55, "appears" should read --appear--.

COLUMN 8
    line 1, "Table" should read --Table 3--.

COLUMN 9
    line 17, "diameter" should read --diameter,--.

UNITED STATES PATENT AND TRADEMARK OFFICE
CERTIFICATE OF CORRECTION

PATENT NO. :  5,247,393
DATED      :  September 21, 1993
INVENTOR(S) : SABURO SUGAWARA It is certified that error appears in the above-indentified patent and that said Letters Patent is hereby corrected as shown below:

COLUMN 10
line 4, "claim 1" should read --claim 1,--;
line 18, "claim 2" should read --claim 2,--;
line 25, "claim 2" should read --claim 2,--;
line 35, "claim 3" should read --claim 3,--;
line 38, "claim 6" should read --claim 6,--;
line 41, "claim 7" should read --claim 7,--;
line 51, "claim 3" should read --claim 3,--;
line 54, "claim 9" should read --claim 9,--; and
line 65, "claim 3" should read --claim 3,--.

COLUMN 11
line 8, "claim 4" should read --claim 4,--;
line 9, "group" should read --unit--;
line 11, "claim 12" should read --claim 12,--;
line 22, "claim 4" should read --claim 4,--; and
line 33, "claim 5" should read --claim 5,--.

UNITED STATES PATENT AND TRADEMARK OFFICE
CERTIFICATE OF CORRECTION

PATENT NO. : 5,247,393
DATED : September 21, 1993
INVENTOR(S) : SABURO SUGAWARA

It is certified that error appears in the above-indentified patent and that said Letters Patent is hereby corrected as shown below:

<u>COLUMN 12</u>
  line 2, "group," should read --unit,--;
  line 6, "claim 5" should read --claim 5,--;
  line 16, "claim 2" should read --claim 2,--;
  line 19, "claim 18" should read --claim 18,--; and
  line 30, "claim 2" should read --claim 2,--.

Signed and Sealed this

Fifth Day of July, 1994

Attest:

BRUCE LEHMAN

*Attesting Officer*  *Commissioner of Patents and Trademarks*